US006720679B2

(12) United States Patent
Harada et al.

(10) Patent No.: US 6,720,679 B2
(45) Date of Patent: Apr. 13, 2004

(54) INTERLOCK CIRCUIT FOR A WORKING VEHICLE

(75) Inventors: Eriya Harada, Sakai (JP); Nobuyuki Yamashita, Izumi (JP); Shinichiro Saji, Sakai (JP); Yoshio Tomiyama, Osaka (JP); Takashi Shibata, Sakai (JP)

(73) Assignee: Kubota Corporation, Osaka (JP)

( * ) Notice: Subject to any disclaimer, the term of this patent is extended or adjusted under 35 U.S.C. 154(b) by 61 days.

(21) Appl. No.: 09/789,485

(22) Filed: Feb. 20, 2001

(65) Prior Publication Data

US 2002/0000759 A1 Jan. 3, 2002

(30) Foreign Application Priority Data

Jun. 30, 2000 (JP) ........................................ 2000-198509

(51) Int. Cl.[7] ............................................... H02H 3/00
(52) U.S. Cl. ........................................ 307/328; 56/10.8
(58) Field of Search ................................. 307/9.1, 10.6, 307/328; 180/273, 274; 318/282; 56/10.5, 10.8

(56) References Cited

U.S. PATENT DOCUMENTS

| | | | | |
|---|---|---|---|---|
| 5,099,936 A | * | 3/1992 | Irikura et al. | 180/53.1 |
| 5,755,098 A | * | 5/1998 | Irikura | 180/53.1 |
| 5,937,697 A | * | 8/1999 | Matsufuji | 74/11 |
| 5,947,218 A | * | 9/1999 | Ishimaru | 180/53.1 |
| 5,994,857 A | | 11/1999 | Peterson, Jr. et al. | 318/282 |
| 6,038,840 A | * | 3/2000 | Ishimori et al. | 56/13.3 |
| 6,109,010 A | * | 8/2000 | Heal et al. | 56/10.8 |
| 6,316,891 B1 | * | 11/2001 | Hough | 318/282 |
| 6,318,485 B1 | * | 11/2001 | Osuga et al. | 180/53.8 |
| 6,405,513 B1 | * | 6/2002 | Hancock et al. | 56/10.8 |
| 6,437,458 B1 | * | 8/2002 | Baggett | 307/9.1 |

* cited by examiner

*Primary Examiner*—Gregory J. Toatley, Jr.
*Assistant Examiner*—Roberto J. Rios
(74) *Attorney, Agent, or Firm*—Webb Ziesenheim Logsdon Orkin & Hanson, P.C.

(57) ABSTRACT

An interlock circuit for a working vehicle having a vehicle body, a working implement attached to the vehicle body, a clutch mechanism for connecting and disconnecting power to the working implement, and a shifting device for determining a traveling direction of the vehicle body. The interlock circuit has a check function to check a backward operational run in which the vehicle body travels backward with the clutch mechanism engaged, and a release function to permit a backward operational run by canceling the check function. The check function checks the backward operational run based on a signal indicating an on/off state of the clutch mechanism and a signal indicating a traveling direction of the vehicle body determined by the shifting device. The release function maintains the check function off continuously by operating a release switch when the clutch mechanism is engaged, and the signal indicating a traveling direction of the vehicle body indicates forward or neutral.

4 Claims, 8 Drawing Sheets

INTERLOCK CIRCUIT FOR A WORKING VEHICLE

BACKGROUND OF THE INVENTION

1. Field of the Invention

This invention relates to an interlock circuit for a working vehicle having a vehicle body, a working implement attached to the vehicle body, a clutch mechanism switchable between an engaged state for transmitting power to the working implement and a disengaged state for breaking power transmission to the working implement, and a shifting device for determining a traveling direction of the vehicle body. More particularly, the invention relates to an interlock circuit having a check function to check a backward operational run in which the vehicle body travels backward with the clutch mechanism engaged, and a release function to permit a backward operational run by canceling the check function.

2. Description of the Related Art

An interlock circuit for a working vehicle having the above construction is shown in U.S. Pat. No. 5,994,857, for example. This prior art construction, basically, checks a PTO (power takeoff) operation when the vehicle travels backward. Particularly when, with the PTO operated, a switch is moved to a momentary on position before the vehicle travels backward, the vehicle is allowed to travel backward (release state). Even when the switch is moved from the momentary on position, the PTO operation is continued as long as the vehicle travels backward. The release state is canceled to stop the PTO operation when the PTO is turned off or the vehicle is reversed to travel forward.

In the above prior art construction, the vehicle is allowed to travel backward with the PTO operated only when the vehicle is caused to travel backward by consciously operating switches in a state of operating the PTO. A backward run with the PTO operated is prevented when the operator makes an operational error or fails to pay good attention, to call for a careful operation. Take an operation with a mower unit for example. When cutting grass around trees or adjacent a fence having a complicated shape, the grass may be cut efficiently by reversing the vehicle back and forth repeatedly with the mower unit operated. In carrying out an operation in such a mode, the mower unit needs to be operated continuously. With the above prior construction, a switch must be operated before driving the vehicle backward, and besides, the PTO operation is stopped when the vehicle is driven forward. Where an operation is performed by driving the vehicle back and forth repeatedly, the switch must be operated each time the vehicle is placed in reverse, which is troublesome. From this viewpoint, the above prior construction has room for improvement.

SUMMARY OF THE INVENTION

The object of this invention is to provide an interlock circuit for a working vehicle, which allows an operation to be carried out by backing the vehicle as necessary, without imposing a troublesome task on the operator.

The above object is fulfilled, according to this invention, by an interlock circuit comprising a check function circuit for performing a check function, the check function circuit being formed of a circuit portion for checking a backward operational run based on a signal indicating a state of the clutch mechanism and a signal indicating a traveling direction of the vehicle body determined by the shifting device; and a release function circuit for performing a release function, the a release function circuit being formed of a circuit portion having a release switch operable to cancel the check function continuously when the signal indicating a state of the clutch mechanism indicates that the clutch mechanism is engaged, and the signal indicating a traveling direction of the vehicle body indicates forward or neutral.

With this construction, when the operator attempts a backward operation run by driving the vehicle body backward with the clutch mechanism engaged, the check function circuit checks the backward operational run based on the signal indicating the state of the clutch mechanism and the signal indicating the traveling direction of the vehicle body. The check function of the check function circuit is canceled only by operating the release switch with the clutch mechanism engaged, and the traveling direction of the vehicle body set to forward or neutral. When the check function of the check function circuit is canceled as above, the check function remains off. Thus, the working implement may be driven continuously when an operation is carried out by reversing the vehicle body backward and forward repeatedly. It is no longer necessary to operate the switch prior to each backward operational run as in the prior art. That is, the interlock circuit according to this invention allows a backward operational run to be performed easily and simply by operating the release switch.

In one preferred embodiment of this invention, the release function circuit is constructed to cancel the release function in favor of the check function when the clutch mechanism is disengaged while the release function is in operation. With this construction, the check function of the check function circuit is reinstated by disengaging the clutch mechanism while the check function is continuously released. Thereafter, the vehicle body cannot be driven backward with the working implement in operation. That is, the check function of the check function circuit is reinstated by a deliberate operation to disengage the clutch mechanism while the check function is canceled. This is rational from the operational point of view.

In another preferred embodiment of this invention, the interlock circuit further comprises an indicator lamp unit tuned off when the check function is in operation, and lit or blinked when the check function is canceled by the release function circuit. In this construction, the indicator lamp is lit or blinked only when the check function is off. The operator can readily recognize that a backward operational run is possible.

As further preferred embodiment, the interlock circuit may further comprise a prohibition circuit unit for prohibiting the release function circuit from canceling the check function. Since the cancellation of the check function by the release function circuit can be prohibited, as necessary, the release switch may be made ineffective to permit a backward operational run.

Other features and advantages of this invention will be apparent from the following description of the embodiment to be taken with reference to the drawings.

DESCRIPTION OF THE PREFERRED EMBODIMENT

An embodiment of this invention will be described hereinafter with reference to the drawings.

Figure 1:
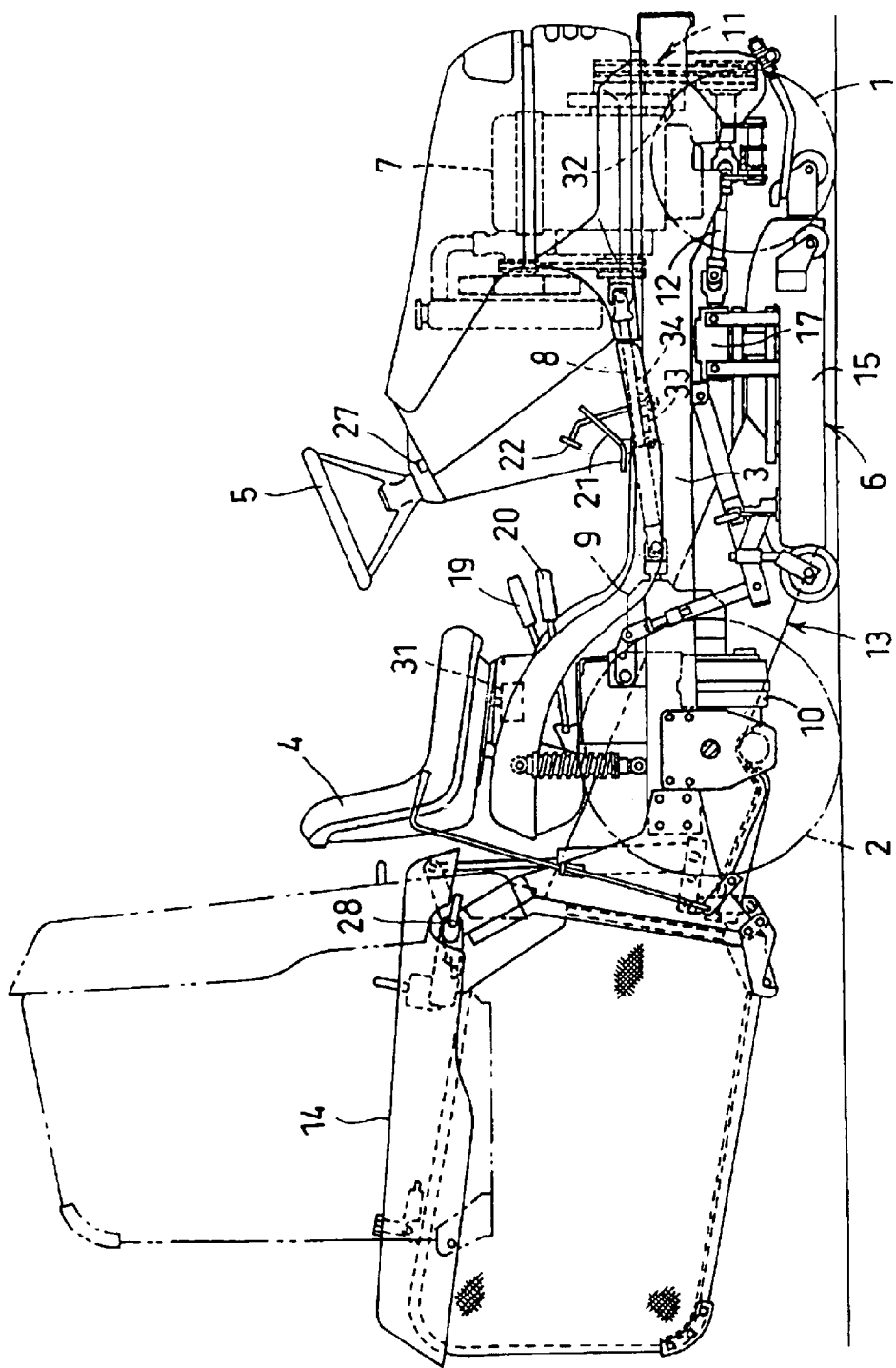
FIG. 1 is a side elevation of a lawn tractor.
Figure 2:
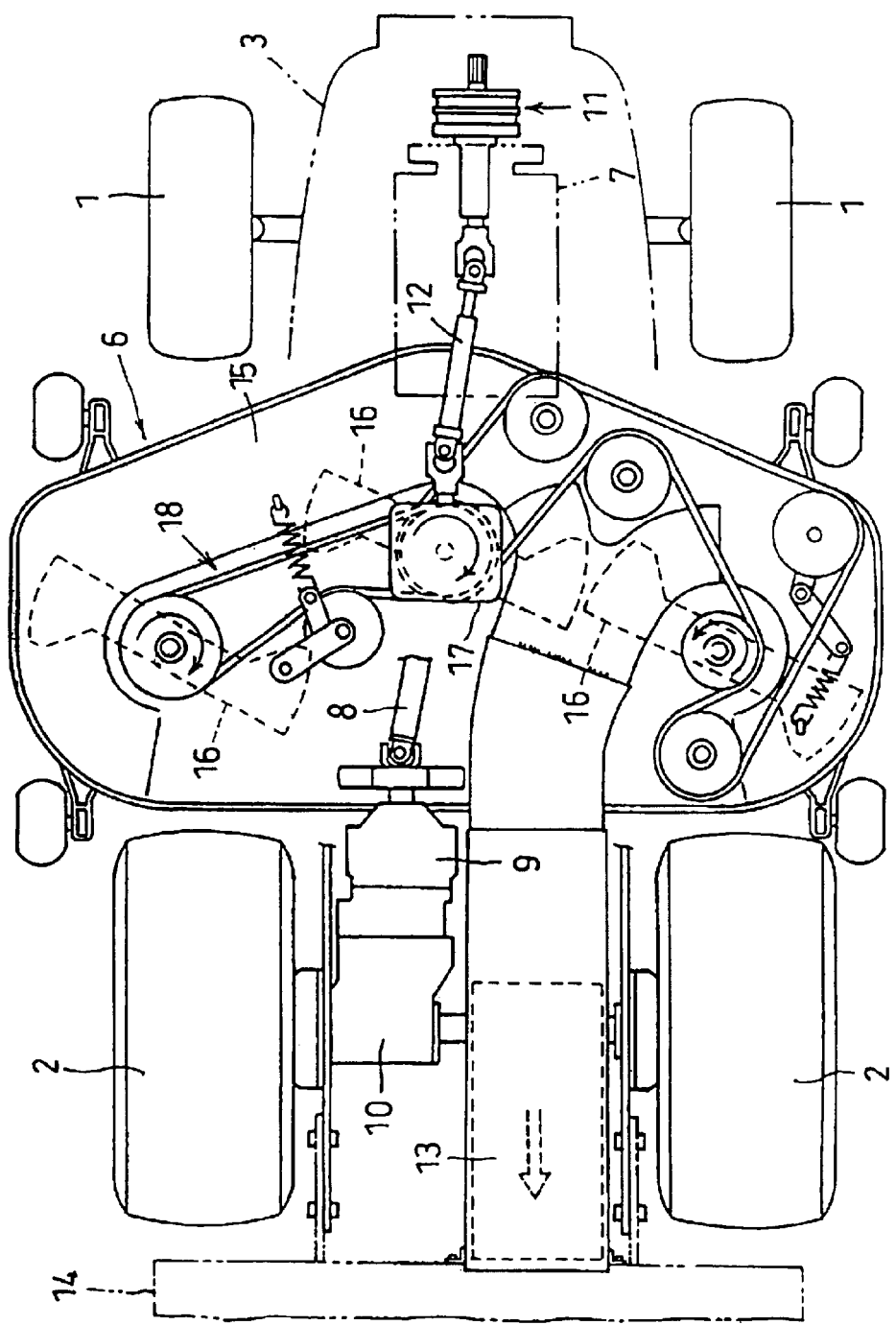
FIG. 2 is a plan view showing an outline of the lawn tractor.

As shown in FIGS. 1 and 2, a lawn tractor acting as a working vehicle includes dirigible front wheels 1 of the non-driven type and rear drive wheels 2 supporting a vehicle body 3 having a driver's seat 4 and a steering wheel 5 arranged thereon. A mower unit 6 is vertically movably suspended from the vehicle body 3 between the front and rear wheels 1 and 2. A diesel engine 7 is mounted on a front portion of vehicle body 3. Power is transmitted from the engine 7 through a transmission shaft 8 to a hydrostatic stepless transmission 9. The stepless transmission 9 and a transmission case 10, the latter transmitting power from the stepless transmission 9 to the right and left rear wheels 2, are arranged in a rearward portion of vehicle body 3. Power is also transmitted from the engine 7 to the mower unit 6 through a belt tension type clutch mechanism 11 and an intermediate transmission shaft 12. Grass clippings are transmitted from the mower unit 6 through a duct 13 to a grass catcher 14 connected to the rear end of vehicle body 3.

The mower unit 6 includes a housing 15 containing three blades 16 rotatable about vertical axes. The mower unit 6 further includes a gear case 17 and a belt transmission mechanism 18 arranged above the upper surface of housing 15 for transmitting power from the intermediate transmission shaft 12 to the respective blades 16. A Lift lever 19 is disposed to the right of driver's seat 4 for vertically moving the mower unit 6. A clutch lever 20 is disposed to the left of driver's seat 4 for manually operating the clutch mechanism 11. The grass catcher 14 is supported to be pivotable about a support shaft 28 extending transversely at the rear end of vehicle body 3 to be switchable to have the rear end of grass catcher 14 set to a raised position shown in phantom lines in FIG. 1 to discharge grass clippings from the grass catcher 14.

Figure 3:
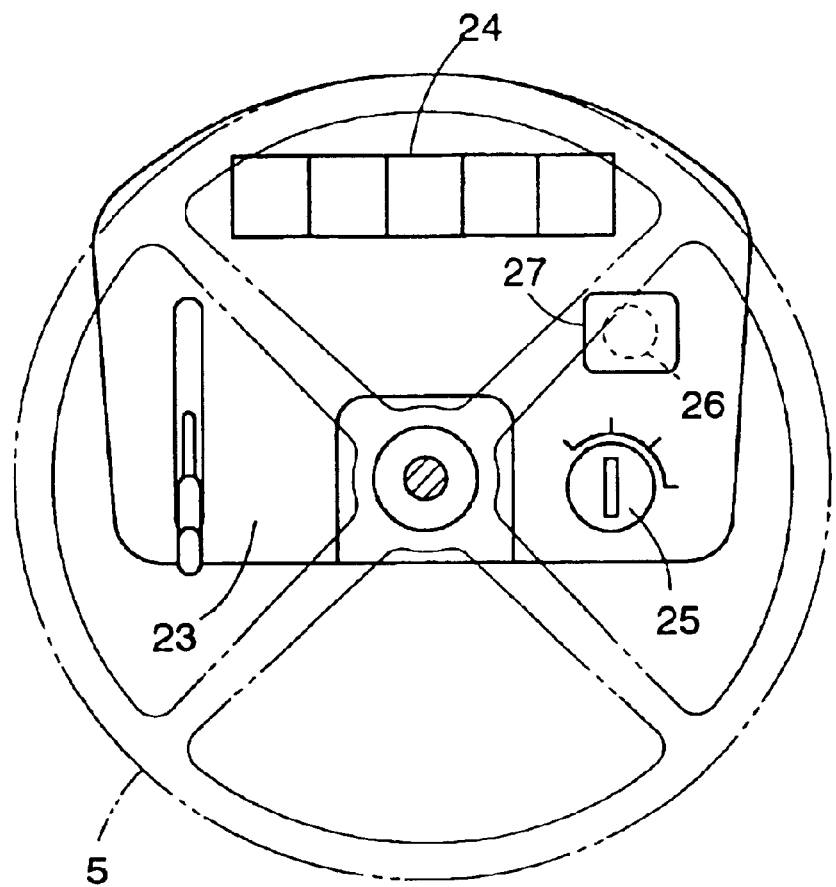
FIG. 3 a plan view showing a control panel.
Figure 5A:
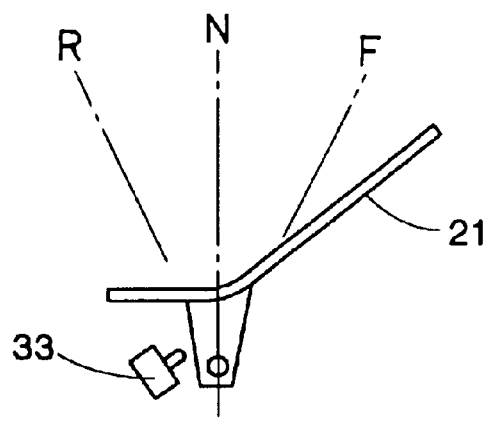
FIG. 5A is a schematic side view of a shift pedal set to a neutral position.
Figure 5B:
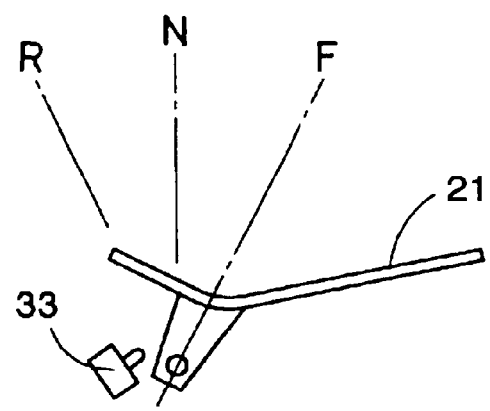
FIG. 5B is a schematic side view of the shift pedal set to a forward drive region.
Figure 5C:
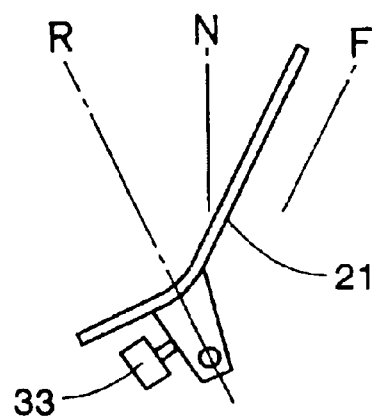
FIG. 5C is a schematic side view of the shift pedal set to a backward drive region.

A shift pedal 21 for shifting the stepless transmission 9, and a brake pedal 22, are arranged on a right portion of a foot-rest forwardly of driver's seat 4, The shift pedal 21, when not operated, is maintained in a neutral position as shown in FIG. 5A to stop the vehicle body 3. The vehicle body 3 is driven forward when the shift pedal 21 is depressed forward from the neutral position as shown in FIG. 5B. The vehicle body 3 is driven backward when the shift pedal 21 is depressed backward from the neutral position as shown in FIG. 5C. The shift pedal 21 is linked to the stepless transmission 9 to produce the above states. The brake pedal 22 is linked to brakes mounted in the transmission case 10. When depressed, the brake pedal 22 causes a braking force to be applied to the rear wheels 2. As shown in FIG. 3, a panel 23 disposed forwardly of driver's seat 4 includes various indicators 24 arranged transversely, such as a lamp lit when a remaining amount of fuel decreases and a lamp lit when oil pressure decreases, a key switch 25, and a release switch 27 with a built-in lamp 26. The release switch 27 is the momentary type that is turned on only when pressed, and has a transparent or semitransparent operation surface, with the lamp 26 mounted inwardly of the operation surface. The release switch 27, when not operated, prevents the vehicle body 3 from moving backward with the mower unit 6 in operation. When the operator consciously operates the release switch 27, the vehicle body 3 is allowed to move backward with the mower unit 6 in operation.

As shown in FIG. 1, the vehicle body 3 has, arranged in various positions thereof, a seat switch 31 for determining presence of the operator on the driver's seat 4 from the weight of the operator, a clutch switch 32 for determining a state of clutch mechanism 11, a shift switch 33 for determining a traveling direction from a direction in which the shift pedal 21 is depressed, and a brake switch 34 for determining whether the brake pedal 22 is depressed to apply the brakes.

Figure 4:
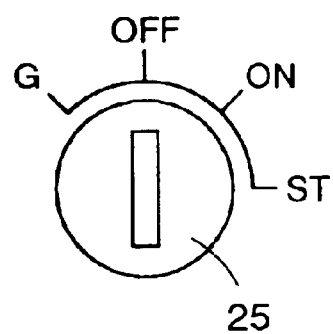
FIG. 4 is a plan view showing a key switch.
Figure 6:
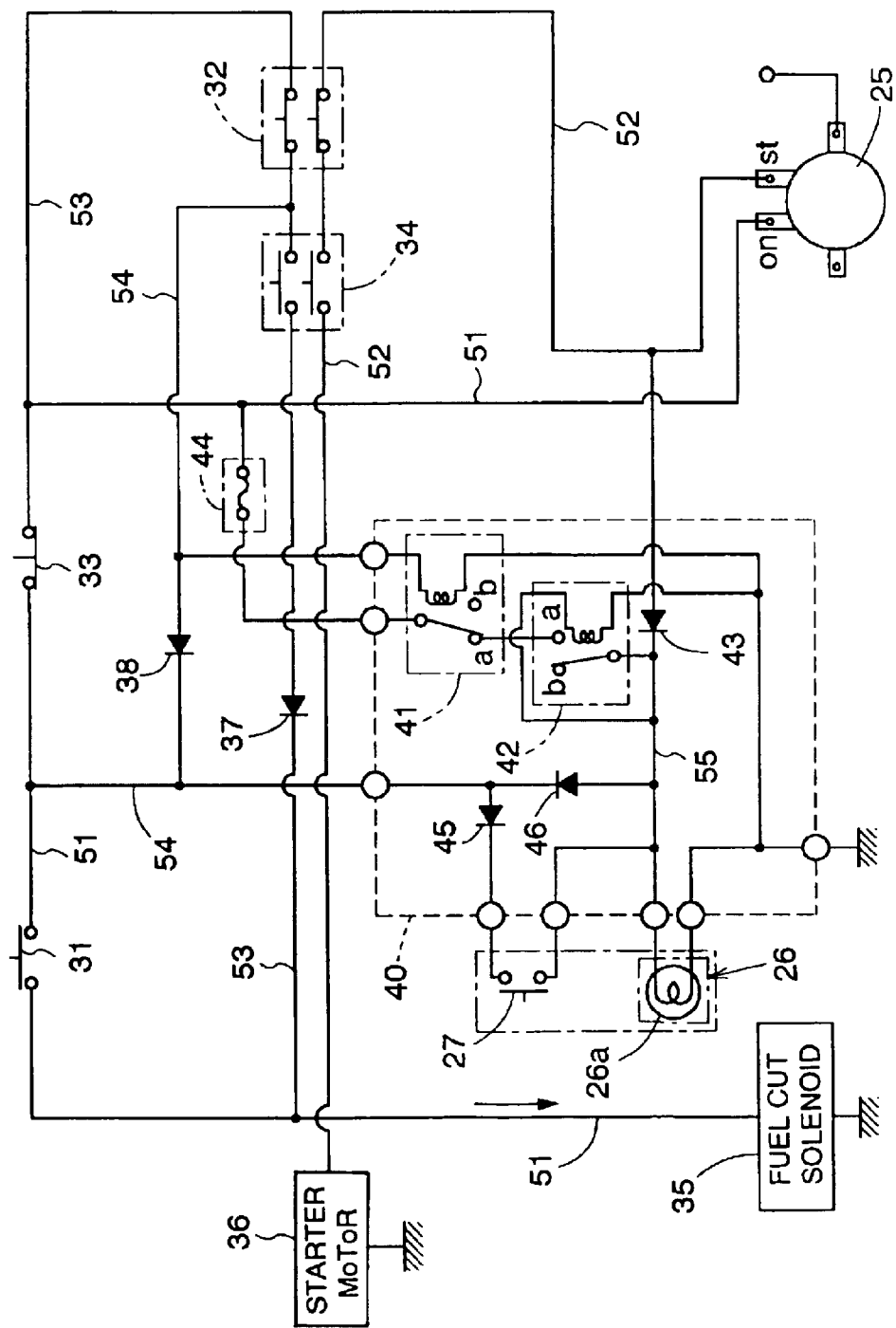
FIG. 6 is an electric circuit diagram.

As shown in FIG. 4, the key switch 25, with a key inserted therein, is operable to an off position OFF for supplying no electric power to any electric devices, a glow position G for supplying electric power to a glow plug (not shown) of engine 7, an on position ON for supplying electric power to the electric devices, and a start position ST for starting the engine 7 while continuing to supply electric power to the electric devices. When the operator maintains the key switch 25 in the start position ST, electric power continues to be supplied to a starter motor 36 (FIG. 6). When released, the key switch 25 is returned to the on position ON by a biasing force of a spring, for example.

FIG. 6 shows one embodiment of interlock circuit according to this invention. This interlock circuit includes a check function circuit portion for prohibiting backing of vehicle body 3 with the mower unit 6 in operation, and a release function circuit portion for canceling the check function when the operator consciously operates the release switch 27.

The key switch 25 has a terminal "on" for supplying electric power when the key switch 25 is operated to the on position ON, and a terminal "st" for supplying electric power when the key switch 25 is operated to the start position ST (no description being made for the glow position G). A first energizing line 51 is formed for supplying a current from terminal "on" to a fuel cutting solenoid 35. To the first energizing line 51, the shift switch 33 and seat switch 31 are connected in series. The fuel cutting solenoid 35, when energized, supplies fuel to the engine 7, and when de-energized, stops the fuel supply. The shift switch 33 is turned on when the shift pedal 21 is in the neutral position or forward region, and turned off when the shift pedal 21 is in the backward region. The seat switch 31 is turned on when the operator is seated on the driver's seat 4, and is turned off when the operator is absent from the driver's seat 4.

The clutch switch 32 and brake switch 34 are the type for opening and closing the two contacts simultaneously. The clutch switch 32 has the two contacts turned off when the clutch mechanism 11 is engaged, and turned on when the clutch mechanism 11 is disengaged. The brake switch 34 has the two contacts turned on when the brake pedal 22 is depressed, and turned off when the brake pedal 22 is released. A second energizing line 52 is formed for supplying electric power from terminal "st" to the starter motor 36 of engine 7. To the second energizing line 52, one of the contacts of clutch switch 32 and one of the contacts of brake switch 34 are connected in series. The starter motor 36 is operable by the electric power supplied.

A third energizing line 53 branches from the first energizing line 51 which supplies current from the terminal "on". The third energizing line 53 supplies electric power to the fuel cutting solenoid 35 through a first diode 37 (bypassing the shift switch 33 and seat switch 31). To the third energizing line 53, the other contact of clutch switch 32 and the other contact of brake switch 34 are connected in series. Further, a fourth energizing line 54 is formed for supplying the current having passed through the clutch switch 32, through a second diode 38 to the first energizing line 51 between the shift switch 33 and seat switch 32.

As shown in FIG. 6, the electric circuit includes a self-hold circuit portion 40. The self-hold circuit portion 40 has a signal line for receiving a signal from the release switch 27, a line for supplying electric power to the lamp 26, a first relay 41 and a second relay 42. That is, the self-hold circuit portion 40 has a main line 55 for supplying a current from terminal "st" (i.e. from the second energizing line 52) to the lamp 26 through a third diode 43, and a line for supplying a current from the fourth energizing line 54 to a solenoid of first relay 41. Further, the self-hold circuit portion 40 has a line for transmitting a current from terminal "on" (i.e. from the first energizing line 51) through a fuse 44 to a contact opened and closed by the first relay 41, and from this contact to the main line 55 through a contact opened and closed by the second relay 42. The main line 55 has a line for transmitting a current from the main line 55 to the solenoid of second relay 42. A line is provided to transmit a current from the fourth energizing line 54 to the main line 55 through a fourth diode 45 and release switch 27. A fifth diode 46 leads a current to the fourth energizing line 54 upon an increase in the potential of main line 55.

The electric circuit system having the above construction functions as follows. When the operator seated on the driver's seat 4 sets the shift pedal 21 to the neutral position and operates the key switch 25 to the on position ON, the fuel cutting solenoid 35 is maintained in a fuel supply state. Further, when the operator turns the key switch 25 to the start position ST with the clutch mechanism 11 disengaged and the brake pedal 22 depressed, the lamp 26 is lit (or may be blinked depending on a circuit construction) and at the same time electric power is supplied to the starter motor 36 to start the engine 7. When, subsequently, the key switch 25 returns from the start position ST to the on position, the lamp 26 is turned off, but the current supplied through the first energizing line 51 maintains the fuel cutting solenoid 35 in the state for supplying fuel to keep the engine 7 running. After the engine 7 is started in this way, the clutch switch 32 remains on as long as the clutch mechanism 11 is disengaged. Consequently, the current continues to be supplied from the third energizing line 53 to the fourth energizing line 54 to allow the vehicle body 3 to travel backward by operation of the shift pedal 21. When the shift pedal 21 is depressed backward with the clutch mechanism 11 engaged (with the mower unit 6 in operation and the clutch switch 32 turned off), the shift switch 33 is turned off. This stops the current from the first energizing line 51 and the current from the fourth energizing line 54, and stops the fuel supply from the fuel cutting solenoid 35 to the engine 7, thereby stopping the engine 7. This is the check function, and the circuit portion providing this function is called the check function circuit portion. This construction is provided by a combination of shift switch 33 and clutch switch 32 for stopping the engine 7 when the clutch mechanism 11 is engaged to drive the vehicle body 3 backward.

When the operator desires to carry out an operation by driving the vehicle body 3 backward while driving the mower unit 6, the operator may press the release switch 27 after engaging the clutch mechanism 11 and setting the shift pedal 21 to the neutral position or forward region. Then, the current is supplied from the first energizing line 51 through the fuse 44, first relay 41 and second relay 42 to the main line 55. As a result, as described hereinafter (see FIG. 7), the self-hold circuit portion 40 reaches a self-hold state to light the lamp 26a of indicator lamp unit 26. The lamp 26a may be blinked by providing a blinking control function circuit portion having a capacitor or the like for the indicator lamp unit 26. With the lighting or blinking of lamp 26a, the current continues to be supplied from the main line 55 to the fourth energizing line 54. Subsequently, the current continues to be supplied to the fuel cutting solenoid 35 to keep the engine 7 running even when the shift pedal 21 is depressed backward, as long as the operator remains seated on the driver's seat 4. Thus, a grass cutting operation may be continued while moving the vehicle body 3 back and forth. This is the release function, and the circuit portion for providing this function is called the release function circuit portion which mainly comprises the self-hold circuit portion 40 to be described in detail hereinafter.

Figure 7:
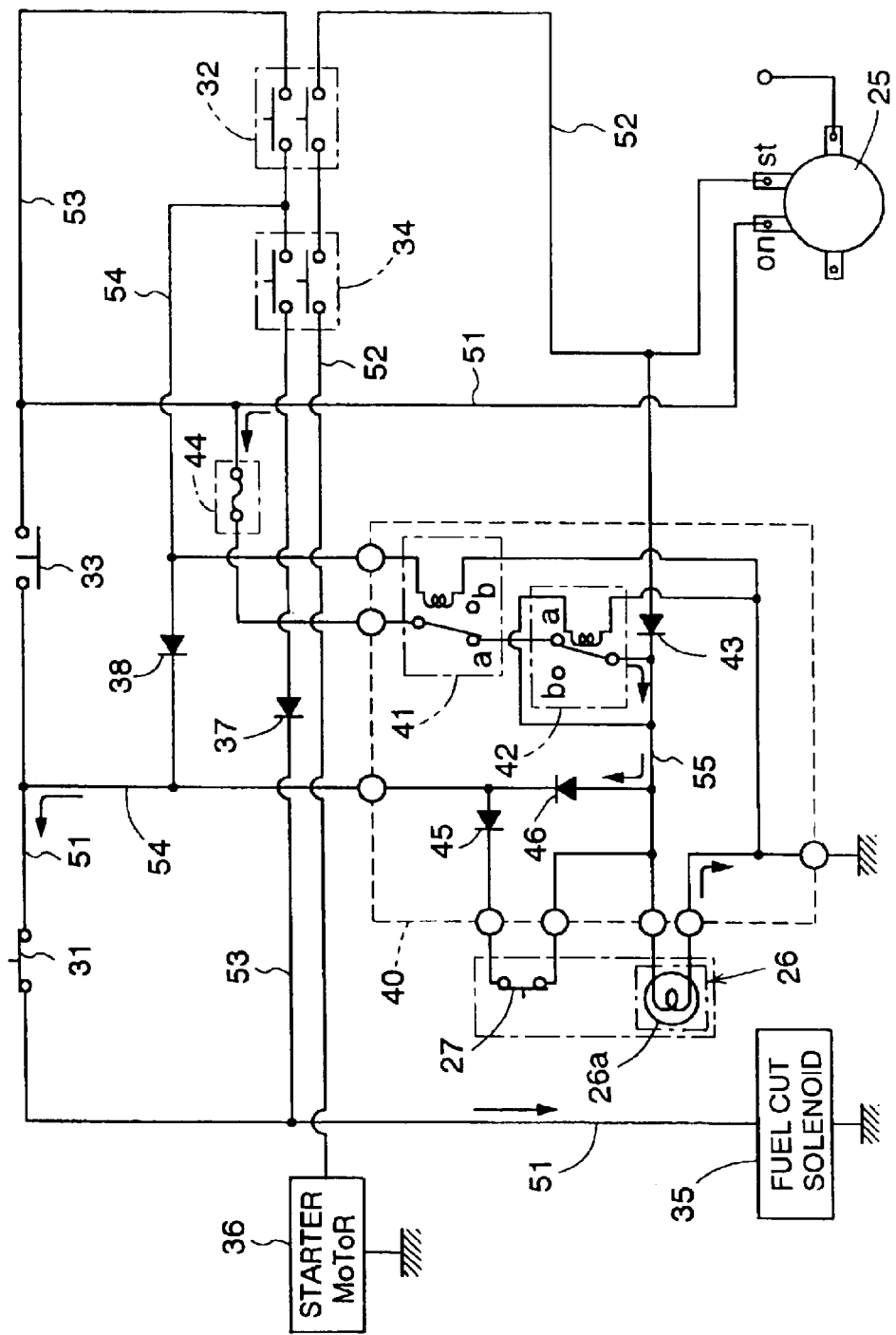
FIG. 7 is an electric circuit diagram showing a state to cancel a check function.

The self-hold circuit portion 40 will be described with reference to FIG. 7. The first relay 41 has the contact switchable to position "b" when the clutch mechanism 11 is disengaged (with the current supplied to the fourth energizing line 54 through the clutch switch 32), and to position "a" when the clutch mechanism 11 is engaged (with the current from the clutch switch 32 stopped). As noted hereinbefore, when the release switch 27 is pressed with the clutch mechanism 11 engaged and the shift pedal 21 set to the neutral position or forward region, the current from the first energizing line 51 flows to the main line 55 through the fourth diode 45 (at this time, the current from the first energizing line 51 flows through part of the fourth energizing line 54). The solenoid of the second relay 42 is energized by this current, whereby the contact is switched from position "b" to position "a", and the current from the contact (in position "a") of first relay 41 flows to the main line 55 through the contact of second relay 42. As a result, the solenoid of second relay 42 remains energized. As indicated by arrows in FIG. 7, the current is continuously supplied from the first energizing circuit 51 (upstream of shift switch 33 with respect to the direction of current flow), which receives the current from the key switch 25, to the main line 55 through the fuse 44 and the contacts of first relay 41 and second relay 42. While lighting the lamp 26 connected to the main line 55, the current of main line 55 is supplied through the fifth diode 46 to the first energizing line 51 downstream of shift switch 33. The fuse 44 may act as a prohibition circuit unit for prohibiting the release function circuit portion from canceling the check function. Of course, the prohibition circuit unit may be given improved operability by employing a switch or the like.

When the clutch mechanism 11 is disengaged with the self-hold circuit portion 40 in the self-hold state as above, the clutch switch 32 is turned on to energize the solenoid of first relay 41 to switch the contact to position "b". As a result, the contact of second relay 42 is de-electrified to stop the current supply to the main line 55. The self-hold state is thereby terminated to stop the current supply from the self-hold circuit portion 40 to the first energizing line 51. When, in this state, the vehicle body 3 is driven backward with the clutch mechanism 11 remaining engaged, the engine 7 is stopped forcibly. Whether the self-hold circuit portion 40 is in the self-hold state or not, the engine 7 is stopped forcibly when the operator leaves the driver's seat 4.

Thus, in this invention, in time of starting the engine 7, fuel supply to the engine 7 is enabled by the operator seated on the driver's seat 4 and the shift pedal 21 set to the neutral position (or to the forward region as far as the interlock circuit is concerned). In this state, the engine is allowed to start, with the clutch mechanism 11 disengaged, the brake pedal 22 depressed, and the key switch 25 operated to the start position ST, that is to say the load on the engine 7 reduced and the vehicle stopped. The lamp 26 is lit at this starting time, to allow detection of any disconnection of lamp 26 with ease. After the engine 7 is started by the above operation, the vehicle may be driven in any selected direction by operating the shift pedal 21 in the forward region and backward region as long as the clutch mechanism 11 is disengaged. In addition, only when the clutch mechanism 11 is engaged to drive the mower unit 6 and the operator consciously operates the release switch 27, the self-hold circuit portion 40 reaches the self-hold state to allow the vehicle body 3 to travel backward with the clutch mechanism 11 remaining engaged to keep driving the mower unit 6. Even when the vehicle body 3 is driven forward after being driven backward, the self-hold circuit portion 40 is maintained in the self-hold state. Thus, when cutting grass around trees or adjacent a fence having a complicated shape, for example, the operation may be carried out by frequently reversing the vehicle body 3 back and forth, without imposing a troublesome task on the operator.

The self-hold state of self-hold circuit portion 40 is canceled when the clutch mechanism 11 is disengaged after an operation carried out by operating the release switch 27 to allow the vehicle body 3 to travel backward as described above. Further, with the self-hold state of self-hold circuit portion 40 canceled, the self-hold circuit portion 40 may be set to the self-hold state again by turning on the release switch 27. Where there is no need to engage in a grass cutting operation by driving the vehicle body 3 backward, the fuse 44 may be removed to avoid an inconvenience of canceling the checking state due to a mis-operation of the release switch 27.

Apart from the above embodiment, this invention may be implemented in other forms as described below (like reference numerals being used to identify like parts in the foregoing embodiment).

Figure 8:
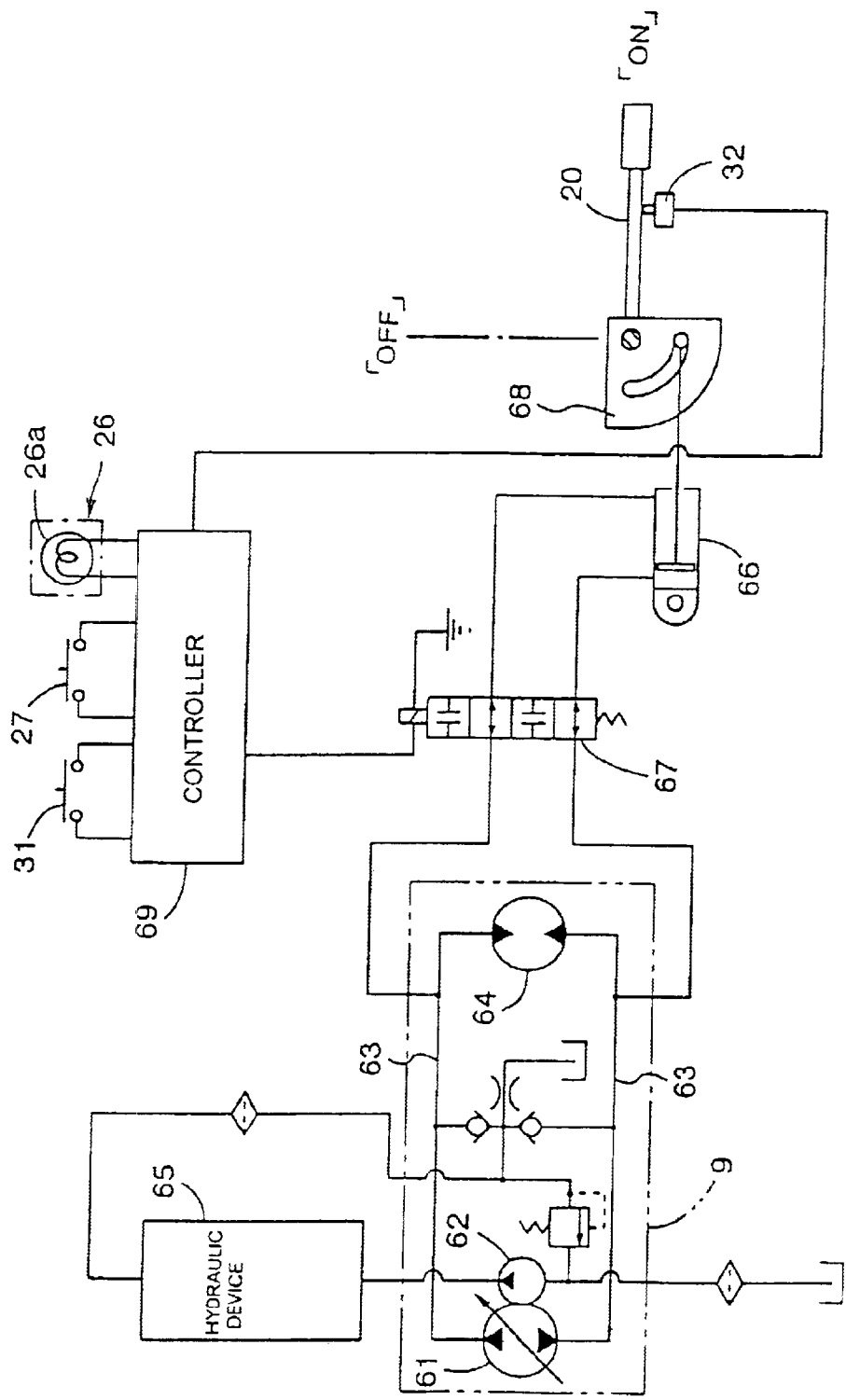
FIG. 8 is a hydraulic circuit diagram showing a different embodiment.

(1) As shown in FIG. 8, the stepless transmission 9 includes a variable displacement pump 61 and a charge pump 62 driven by the engine 7, and a hydraulic motor 64 for receiving pressure oil from the hydraulic pump 61 and draining the pressure oil through a pair of oil lines 63. Pressure oil from the charge pump 62 is supplied to a hydraulic device 65 mounted on the vehicle body, and then to the oil lines 63 to compensate for any leakage. It is assumed in this embodiment that, when driving the vehicle body 3 forward, a higher pressure occurs in the upper oil line 63 in FIG. 8 and a lower pressure in the lower oil line 63, and when driving the vehicle body 3 backward, a lower pressure occurs in the upper oil line 63 and a higher pressure in the lower oil line 63. The illustrated circuit includes a double-acting hydraulic cylinder 66 operable by a pressure difference between these oil lines 63, and an electromagnetic selector valve 67 for stopping oil flows to and from the hydraulic cylinder 66. The hydraulic cylinder 66 and clutch lever 20 are linked to each other through a plate 68 defining a slot to operate the clutch lever 20 forcibly to a declutching position for disengaging the clutch mechanism 11.

Figure 9:
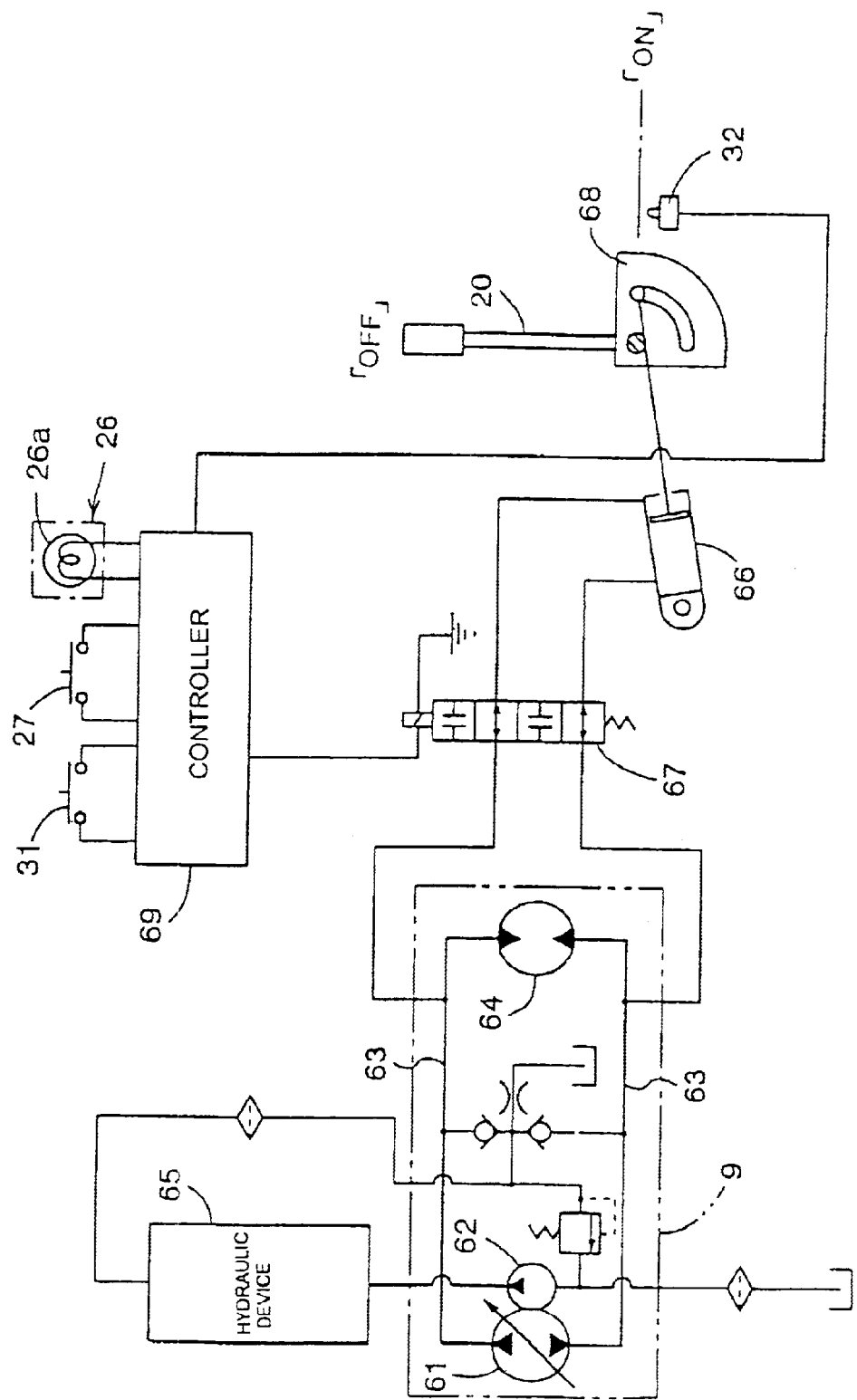
FIG. 9 is a hydraulic circuit diagram with a hydraulic cylinder in operation in a further embodiment.

The selector valve 67 is operable by a controller 69. The controller 69 receives signals from the clutch switch 32 which detects the clutch lever 20 in the engaging position, the seat switch 31 which detects the operator seated on the driver's seat 4, and the release switch 27. The controller 69 outputs a signal to supply a current to the lamp 26. A control device in the form of software, for example, is set to the controller 69 to light the lamp 26 and operate the selector valve 67 to a stop position only when the operator consciously operates the release switch 27 with the clutch mechanism 11 engaged to drive the working implement 6. When the vehicle body 3 is driven backward in a normal operation (with the release switch 27 turned off) and the clutch lever 20 in the engaging position, as shown in FIG. 9, the piston rod of hydraulic cylinder 66 is extended to operate the clutch lever 20 forcibly to the declutching position to disengage the clutch mechanism 11. When the vehicle body 3 is driven backward after turning on the release switch 27, with the clutch lever 20 in the engaging position, the clutch mechanism 11 is maintained engaged to allow the vehicle body 3 to travel backward while continuing to drive the working implement 6.

That is, in these two embodiments, the interlock circuit is provided, in respect of both hardware and software, by the controller 69 having a microcomputer unit as the central element.

(2) The clutch mechanism 11 may be the electromagnetic type for transmitting power and disconnecting power transmission to a working implement such as the mower unit 6.

The interlock circuit can be constructed to cancel the checking state by pressing the release switch 27 once, and reinstate the checking state by pressing the release switch 27 a second time. It will be advantageous in this case that the interlock circuit is provided in software form by using a microcomputer unit such as the above controller 69.

What is claim is:

1. An interlock circuit for a working vehicle having a vehicle body, a working implement attached to the vehicle body, a clutch mechanism switchable between an engaged state for transmitting power to the working implement and a disengaged state for breaking power transmission to the working implement, and a shifting device for determining a traveling direction of the vehicle body, the interlock circuit having a check function to check a backward operational run in which the vehicle body travels backward with the clutch mechanism engaged, and a release function to permit a backward operational run by canceling the check function, said interlock circuit comprising:

a check function circuit for performing said check function, said check function circuit being Formed of a circuit portion for checking said backward operational run based on a signal indicating a state of said clutch mechanism and a signal indicating a traveling direction of said vehicle body determined by said shifting device;

a release function circuit for performing said release function, said release function circuit being formed of a circuit portion having a release switch operable to cancel said check function continuously when said signal indicating a state of said clutch mechanism indicates that said clutch mechanism is engaged, and said signal indicating a traveling direction of said vehicle body indicates forward or neutral;

a prohibition circuit unit for prohibiting said release function circuit from canceling said check function; and a clutch switch, wherein disengaging said clutch mechanism turns said clutch switch ON, to allow the vehicle body to travel backward by the shifting device even when said check function circuit performs said check function; and engaging said clutch mechanism turns said clutch switch OFF, to cause the current in the interlock circuit to bypass through said prohibition circuit unit when said release function circuit performs said release function.

2. An interlock circuit as defined in claim 1, wherein said prohibition circuit unit comprises a detachable fuse, and wherein detaching said fuse prohibits said release function circuit from canceling said check function.

3. An interlock circuit as defined in claim 1, wherein said release function circuit is constructed to cancel said release function in favor of said check function when said clutch mechanism is disengaged while said release function is in operation.

4. An interlock circuit as defined in claim 1, further comprising an indicator lamp unit turned off when said check function is in operation, and lit or blinked when said check function is canceled by said release function circuit.

* * * * *

UNITED STATES PATENT AND TRADEMARK OFFICE
CERTIFICATE OF CORRECTION

PATENT NO. : 6,720,679 B2
DATED : April 13, 2004
INVENTOR(S) : Harada et al.

It is certified that error appears in the above-identified patent and that said Letters Patent is hereby corrected as shown below:

<u>Title page,</u>
Item [56], References Cited, U.S. PATENT DOCUMENTS, insert:
-- 5,301,494     4/1994         Peot et al.         56/10.5 --

Signed and Sealed this

Sixteenth Day of November, 2004

JON W. DUDAS
*Director of the United States Patent and Trademark Office*